(12) United States Patent
Coffin

(10) Patent No.: US 8,011,081 B1
(45) Date of Patent: Sep. 6, 2011

(54) BEDKNIFE FOR REEL CUTTING UNIT AND MANUFACTURING METHOD FOR SAME

(75) Inventor: Scott M. Coffin, Plymouth, MN (US)

(73) Assignee: The Tord Company, Bloomington, MN (US)

( * ) Notice: Subject to any disclaimer, the term of this patent is extended or adjusted under 35 U.S.C. 154(b) by 1160 days.

(21) Appl. No.: 11/698,292

(22) Filed: Jan. 25, 2007

(51) Int. Cl.
*B23P 11/00* (2006.01)
(52) U.S. Cl. .................................................. 29/525.14
(58) Field of Classification Search ............... 29/525.14, 29/525.13, 428; 228/262.8, 262.9, 223, 226, 228/225
See application file for complete search history.

(56) References Cited

U.S. PATENT DOCUMENTS 2,882,593 A * 4/1959 Merlub-Sobel et al. ...... 228/223

OTHER PUBLICATIONS

Part of Toro Drawing 106-7530, 2004, showing admitted prior art bedknife with insert. Note section A-A and notes 1-3.

* cited by examiner

*Primary Examiner* — John C Hong
(74) *Attorney, Agent, or Firm* — James W. Miller

(57) ABSTRACT

A method of manufacturing a bedknife for a reel cutting unit comprises providing a base having a tool steel insert that forms a cutting edge of the bedknife. The base comprises a heat treatable steel. Both the base and the insert are heat treated prior to joining the insert to the base. The insert is then integrally joined to the base by brazing the two together using a silver based filler between the two.

8 Claims, 1 Drawing Sheet

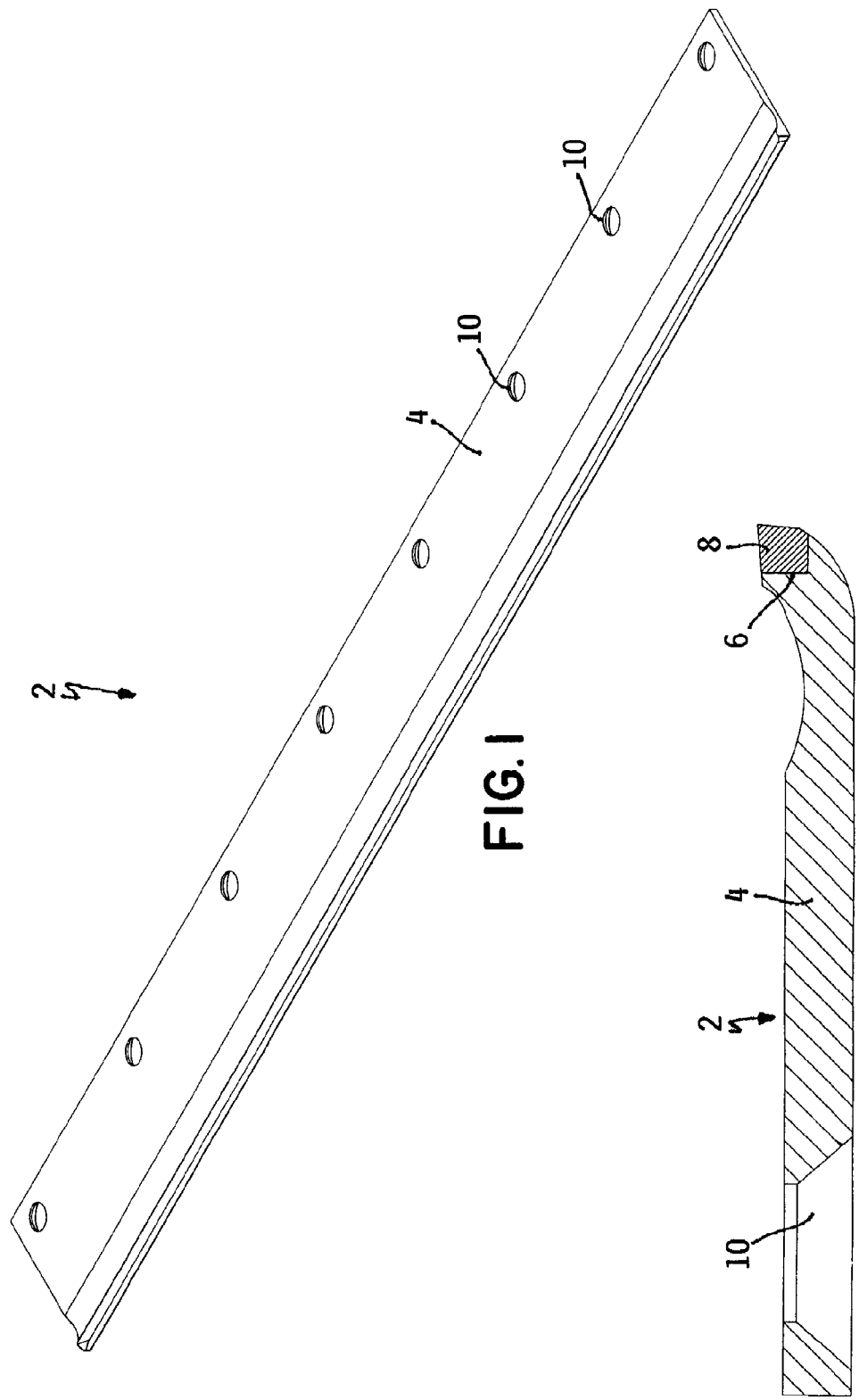

BEDKNIFE FOR REEL CUTTING UNIT AND MANUFACTURING METHOD FOR SAME

TECHNICAL FIELD

This invention relates generally to a reel mower having a reel cutting unit. More particularly, this invention relates to the bedknife used on the reel cutting unit.

BACKGROUND OF THE INVENTION

Reel mowers are well known pieces of outdoor power equipment used for cutting grass. Reel mowers are so named because they have at least one reel cutting unit that includes a bladed reel that rotates about a generally horizontal axis. Usually the blades of the reel are not themselves sharpened though in some instances they have been known to be sharpened. The primary purpose of the blades of the reel is to sweep the blades of uncut grass against the leading edge of a bedknife that is fixed on the frame of the reel cutting unit. The interaction between the blades of the reel and the bedknife shears the grass blades to cut the grass.

The geometry of a typical reel cutting unit usually places the bedknife beneath the rotatable reel and behind the centerline of the reel. In order to be effective in cutting grass, the reel and bedknife are adjusted so that the blades of the reel are either immediately adjacent to or in slight contact with the bedknife as the reel rotates. This provides a scissors type shearing action between the reel and the bedknife that is effective for cutting grass.

Many conventional bedknives are integrally formed from a single piece of steel that is then heat treated to increase hardness and durability. The tip of the bedknife is often sharpened to provide a cutting edge. Traditionally, such bedknives are quite strong and resistant to breaking from impact. However, such monolithic steel bedknives typically wear fairly quickly, requiring the cutting edge to be resharpened or the bedknife to be replaced. This is a disadvantage to single piece bedknives of this type.

Other known bedknives attempt to improve upon the wearability of single piece bedknives. These other bed-knives typically comprise a base that carries an insert at the tip thereof with the insert forming the cutting edge of the bedknife. In known insert bedknives, the base material comprises a less expensive, non-hardenable, low carbon steel (such as SAE 1018 or 1020). The insert comprises a much more expensive tool steel (such as M2). Neither the base material nor the tool steel are heat treated prior to their being joined together.

In manufacturing such insert bedknives, the base is provided with a seat at the tip thereof to receive the insert. The insert is placed into the seat with a copper brazing alloy being used at the interface between the insert and the seat. The insert is then brazed into place to integrally join the insert to the base by heating the copper filler at relatively high temperatures of approximately 2000° F. or so. This heating process both joins the insert to the base as well as heat treats the insert in situ to increase the hardness of the insert. This heating process does not, however, appreciably strengthen or harden the base material due to the fact that the base material is substantially non-hardenable even when heat is applied.

The Applicants herein have observed that conventional insert bedknives made as described above have relatively low yield strength in the base material. Yield strength is defined as the amount of force required to permanently deform the bedknife. As a result of this low yield strength, the Applicants herein have further observed two failure modes for conventional bedknives.

In the first failure mode, the bedknife strikes foreign objects during operation of the reel cutting unit, including but not limited to tree roots, drainage grates, bolts lying on the ground, yardage markers, etc. The impact with foreign objects is often significant to cause the bedknife to chip or fracture. This requires that the bedknife be repaired or even replaced if the area that is damaged is too large. This failure mode contributes to decreased customer satisfaction and higher warranty costs to the manufacturer of the reel cutting unit.

In the second failure mode, the bedknife can sometimes be deflected upwardly so that it interferes with the blades of the spinning or rotating reel. When a given blade then comes into contact with or strikes the bedknife, it is possible to peel off a portion of the hard edge of the bedknife. This is particularly true for bedknives that are extremely thin, such as those used on the reel cutting units of greensmowers. Such an occurrence completely destroys the bedknife requiring that the bedknife be totally replaced. It also can significantly damage the rotatable reel, further leading to other repair or replacement costs in conjunction with the reel.

Accordingly, there is a need in the reel mower art for a bedknife base or body with improved yield strength to minimize the aforementioned failures described above.

SUMMARY OF THE INVENTION

One aspect of this invention relates to a method of manufacturing a bedknife for a reel cutting unit of a reel mower. The bedknife acts in concert with the blades of a rotatable cutting reel such that grass is pushed against a cutting edge of the bedknife by the blades of the rotatable cutting reel, thus shearing the grass between the cutting edge of the bedknife and the reel blades. The bedknife comprises a base with an insert fitted or secured to the base in a seat at the leading edge of the base such that the insert forms the cutting edge of the bedknife. The method comprises selecting a heat treatable steel as the material for the base and selecting a tool steel as the insert material. The base and insert materials are heat treated prior to the insert being joined to the base by brazing. Brazing comprises heating the insert and the base material assembly locally or generally to a temperature high enough to cause a filler between the base material and the insert to melt and flow. The insert and the base material become an integral unit as the filler solidifies during cooling. The filler shall have a melting temperature that is equal to or less than approximately 1300° F. to avoid substantially softening the insert or the base material.

Another aspect of this invention relates to a method of manufacturing a bedknife for a reel cutting unit which comprises providing a base that is adapted to carry a tool steel insert that forms a cutting edge of the bedknife, using a heat hardenable steel as the material of the base, heat treating both the heat hardenable steel base material and the tool steel insert prior to joining the insert to the base, and integrally joining the base to the insert by brazing the insert to the base using a silver based filler between the insert and the base.

Another aspect of this invention relates to a bedknife manufactured by such manufacturing method(s).

BRIEF DESCRIPTION OF THE DRAWINGS

This invention will be described hereafter in the Detailed Description, taken in conjunction with the following drawings, in which like reference numerals refer to like elements or parts throughout.

FIG. 1 is a perspective view of a bedknife according to this invention, the bedknife being used on a reel cutting unit of a reel mower; and FIG. 2 is a longitudinal cross-sectional view through the bedknife of FIG. 1.

DETAILED DESCRIPTION

FIGS. 1 and 2 show a bedknife for a reel cutting unit of a reel mower with the bedknife being generally illustrated as 2. Bedknife 2 is elongated and includes a base 4 having a front tip that includes an L-shaped, upwardly facing shelf or seat 6. An insert 8 is located in seat 6 and forms the cutting edge of bedknife 2. The rear of bedknife 2 includes a plurality of holes 10 for mounting bedknife 2 to the bedbar of a reel cutting unit (not shown) of a reel mower (not shown). When so mounted, bedknife 2 underlies a portion of the rotatable reel (not shown) of the reel cutting unit with insert 8 closely approaching or even slightly touching the orbit of the blades of the rotatable reel depending upon the degree of desired adjustment between bedknife 2 and the reel. The structure per se of 2 bedknife as depicted in FIGS. 1 and 2 is generally conventional, i.e. prior art bedknives look the same as what is shown in FIGS. 1 and 2.

This invention relates to the selection of various materials for use in base 4 and insert 8 of bedknife 2, to the treatment of these materials prior to their being joined together, and to how these materials are joined together to form a completed bedknife, i.e. to the method of manufacture of a new and improved bedknife. This invention also relates to the new and improved bedknife so formed and manufactured.

This invention relates to the use of a heat treatable steel as the material of base 4 and the use of a tool steel (such as M Series tool steels)) as the material for insert 8. The steel used as the base material comprises heat treatable structural or spring steel or cold worked steel with similar strength and hardness properties. The tool steel is preferably wear resistant. Both the base material and insert 8 are heat treated to increase their hardness prior to their being joined together with the base material preferably being treated to at least approximately 30 HRC and the tool steel preferably being treated to at least approximately 50 HRC on the Rockwell hardness scale.

Preferably, the base material has at least 30 points of carbon or higher. One material that has been used as the base material is an SAE 1566 steel having 66 points of carbon. The base material must have enough carbon that it will become substantially harder with the application of heat so that it is now possible to effectively heat treat the base material because of the higher carbon content of the steel used in the base material as compared to the lower carbon steels used in the past (i.e the steels having only 18 or 20 points of carbon).

In joining base 4 and insert 8 together, insert 8 is placed in seat 8 at the tip of base 4 with a silver based filler being used at the interface between seat 8 and insert 8, i.e. along the two sides of insert 8 that contact or abut with the L-shaped seat 6. The method of manufacture then concludes by brazing insert 8 to base 4 at a lower temperature than with prior art bedknives. Because of the use of a silver based material as the filler instead of copper, insert 8 can be brazed onto base 4 by heating at approximately 1150-1200° F. rather than at 2000-2100° F. with prior art bedknives. Materials that are not silver based could be used as the filler provided that the melting temperatures of such filler are lower than approximately 1300° F.

The Applicants have found that this manufacturing method provides a bedknife with much improved yield strength in the base material. Insert 8 and base 4 are both heat treated prior to their being joined together. However, when being joined together, the brazing process is done at a much lower temperature, e.g. at or less than 1300° F. such as the 1150-1200° F. needed for a silver based filler rather than at 2000-2100° F. The brazing step also preferably takes place uniformly using a constant brazing temperature and time without trying to braze at much higher temperatures for shorter periods of time. This lower temperature does not appreciably temper either the tool steel used in insert 8 or the heat treated base material since high speed steels and conventional heat treatable steels both temper quickly above 1300° F. but not below this temperature. This avoids appreciably weakening the strength previously provided in the base material by the heat treating step done prior to insert 8 and base 4 being joined together. Thus, the brazing step does not significantly lower the yield strength of the base material of bedknife 2.

Accordingly, bedknife 2 of this invention is significantly more resistant to damage than prior art insert bedknives because its yield strength is considerably improved. Impacts with tree roots, drainage grates, or other objects are much less likely to chip or break bedknife 2. In addition, should bedknife 2 deflect up into closer contact with the blades of the cutting reel, the reel blades are far less likely to peel portions of bedknife 2 into the reel. In fact, the Applicants have observed that bedknife 2 is strong enough to often simply stop or jam the rotation of the cutting reel when bedknife 2 is struck by a blade of the cutting reel. In the past, such impacts would have broken bedknife 2 and peeled portions of bedknife 2 into and through the reel, damaging both bedknife 2 and the cutting reel. Now, damage is avoided to the cutting reel and bedknife 2 is either undamaged or sufficiently lightly damaged so as to be easily repairable.

Various modifications of this invention will be apparent to those skilled in the art. Accordingly, this invention is to be limited only by the appended claims.

I claim:

1. A method of manufacturing a bedknife for a reel cutting unit of a reel mower, the bedknife cooperating with a plurality of blades of a rotatable cutting reel such that grass is pushed against a cutting edge of the bedknife by the blades of the rotatable cutting reel to cut the grass by shearing the grass between the cutting edge of the bedknife and the reel blades, the bedknife further having a base with an insert fitted or secured to the base in a seat at a leading edge of the base such that the insert forms the cutting edge of the bedknife, which comprises:
   (a) selecting a heat treatable steel as a material for the base and selecting a tool steel as a material for the insert;
   (b) heat treating the base and the insert materials prior to the insert being joined to the base;
   (c) brazing the insert to the base material by heating the insert and the base material assembly locally or generally to a temperature high enough to cause a filler between the base material and the insert to melt and flow with the insert and the base material becoming an integral unit as the filler solidifies during subsequent cooling; and
   (d) wherein the filler shall have a melting temperature that is equal to or less than approximately 1300° F. to avoid substantially softening the insert or the base material during brazing.

2. The method of claim 1, wherein the filler comprises a silver based filler.

3. The method of claim 2, wherein the brazing step comprises heating at approximately 1150-1200° F.

4. The method of claim 1, wherein the brazing step comprises brazing at a substantially uniform temperature for a period of time sufficient to melt the filler.

5. The method of claim 1, wherein the insert is heat treated to 50 HRC or above.

6. The method of claim 1, wherein the base material has at least 30 points of carbon content.

7. The method of claim 1, wherein the base material is heat treated to 30 HRC or above.

8. A method of manufacturing a bedknife for a reel cutting unit, which comprises:

(a) providing a base that is adapted to carry a tool steel insert that forms a cutting edge of the bedknife;
(b) using a heat treatable steel as a material of the base;
(c) heat treating both the heat treatable steel base material and the tool steel insert prior to joining the insert to the base; and
(d) integrally joining the base to the insert by brazing the insert to the base using a silver based filler between the insert and the base.

* * * * *

UNITED STATES PATENT AND TRADEMARK OFFICE
CERTIFICATE OF CORRECTION

| | | |
|---|---|---|
| PATENT NO. | : 8,011,081 B1 | Page 1 of 1 |
| APPLICATION NO. | : 11/698292 | |
| DATED | : September 6, 2011 | |
| INVENTOR(S) | : Scott M. Coffin | |

It is certified that error appears in the above-identified patent and that said Letters Patent is hereby corrected as shown below:

Title Page, Item [73], Assignee, "The Tord Company" should read --The Toro Company--.

Signed and Sealed this
Eighteenth Day of October, 2011

David J. Kappos
*Director of the United States Patent and Trademark Office*